(12) United States Patent
Moon (10) Patent No.: US 6,783,256 B2
(45) Date of Patent: Aug. 31, 2004

(54) DIRECT-TYPE BACK LIGHT DEVICE AND METHOD OF MANUFACTURING THE SAME

(75) Inventor: Jeong Min Moon, Kyonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/183,487

(22) Filed: Jun. 28, 2002

(65) Prior Publication Data

US 2003/0090901 A1 May 15, 2003

(30) Foreign Application Priority Data

Nov. 9, 2001 (KR) .................................. 10-2001-69761

(51) Int. Cl.⁷ .............................................. G09F 13/04
(52) U.S. Cl. .................... 362/241; 362/561; 362/97; 362/217
(58) Field of Search ................................ 362/330, 581, 362/561, 29, 31, 97, 217, 218, 223, 224, 225, 235, 240, 241, 245, 246, 247, 260, 263; 349/70, 71, 64; 345/102; 248/50; 313/251, 269; 364/29, 31

(56) References Cited

U.S. PATENT DOCUMENTS

| | | | | |
|---|---|---|---|---|
| 5,195,818 A | * | 3/1993 | Simmons et al. | 362/224 |
| 5,387,921 A | * | 2/1995 | Zhang et al. | 345/102 |
| 5,504,545 A | * | 4/1996 | Hagihara et al. | 353/74 |
| 5,567,042 A | * | 10/1996 | Farchmin et al. | 362/241 |
| 6,199,310 B1 | * | 3/2001 | Mueller et al. | 40/564 |
| 2001/0021110 A1 | * | 9/2001 | Nakayama et al. | 362/247 |
| 2002/0044437 A1 | * | 4/2002 | Lee | 362/31 |

FOREIGN PATENT DOCUMENTS

| | | | | |
|---|---|---|---|---|
| JP | | 201022285 A | * | 1/2001 |
| JP | | 2001210126 A | * | 8/2001 |

* cited by examiner

Primary Examiner—Thomas M. Sember
Assistant Examiner—Hargobind S Sawhney
(74) Attorney, Agent, or Firm—Morgan, Lewis & Bockius LLP (57) ABSTRACT

A direct-type back light device includes a plurality of luminescent lamps, a rectangular frame having holes formed along opposing sides with the luminescent lamps inserted into the holes, a reflecting plate formed at a bottom surface of the rectangular frame, and at least one lamp holder attached to the reflecting plate and supporting the luminescent lamps.

28 Claims, 7 Drawing Sheets

DIRECT-TYPE BACK LIGHT DEVICE AND METHOD OF MANUFACTURING THE SAME

The present invention claims the application benefit of the Korean Application No. P2001-069761 filed in Korea on Nov. 9, 2001, which is hereby incorporated by reference.

BACKGROUND OF THE INVENTION

1. Field of the Invention

The present invention relates to a back light device and a method of manufacturing a back light device, and more particularly, to a direct-type back light device for a liquid crystal display (LCD) device and a method of manufacturing the same.

2. Discussion of the Related Art

In general, display screens of ultra thin-sized flat panel display devices having a thickness of several centimeters or less, and are commonly used as monitors for notebook computers, spacecraft, and aircraft. The display devices include a back light provided at a rear of a liquid crystal panel that is commonly used as a light source. However, the back light is inefficient because of its weight, power consumption, and overall thickness. The back light is formed of parallel cylindrical luminescent lamps, and may be classified into two difference categories: direct-type and light guiding plate-type.

In the direct-type back light device, luminescent lamps are arranged in parallel on a flat panel. However, a minimum distance between the luminescent lamps and the liquid crystal panel must be maintained in order to prevent an image of the luminescent lamps from being displayed onto the liquid crystal panel. In addition, a light scattering system must be provided for uniform light distribution. Accordingly, the direct-type back light device has a relatively large overall size. With the advent of large-sized display panel devices, a light-emitting area of the back light device must be increased. Accordingly, the direct-type back light device and light scattering system must also increase, wherein the light-scattering system should have a sufficient thickness to maintain a flat light-emitting area.

In the light guiding plate-type back light device, fluorescent lamps are provided along an outside periphery of a flat panel to disperse light using a light guiding plate. However, luminance is relatively low since the fluorescent lamps are provided along the outside periphery and the light must pass through the light guiding plate. In addition, advanced optical design and processing technologies are required to provide uniform distribution of luminous intensity.

The direct-type back light device and the light guiding plate-type back light device each have their own unique problems. For example, a direct-type back light device is commonly used for LCD devices such as monitors for personal computer or television where brightness of an image is more important than an overall thickness of the LCD device. On the other hand, a light guiding plate-type back light device is commonly used for LCD devices such as notebook computers where overall thickness of the LCD device is critical.

Figure 1:
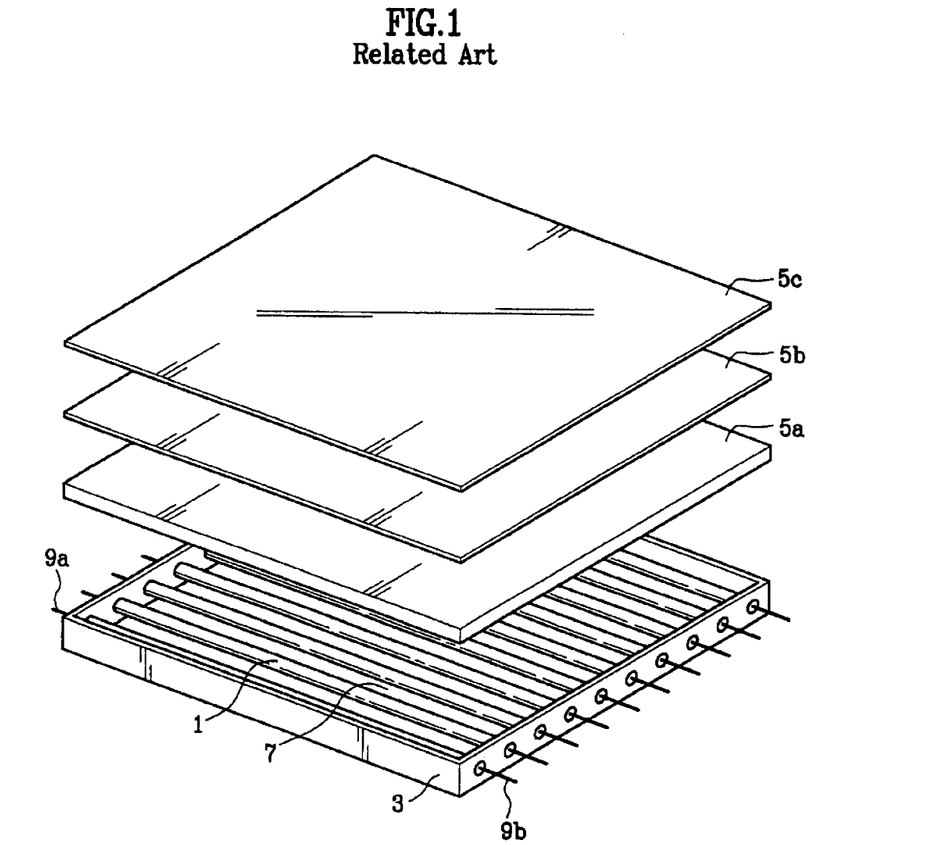
FIG. 1 is a perspective view of a direct-type back light device according to the related art.

FIG. 1 is a perspective view of a direct-type back light device according to the related art. In FIG. 1, the direct-type back light device includes a plurality of luminescent lamps 1, an outer case 3 that fixes and supports the luminescent lamps 1, and a light scattering system 5a, 5b and 5c arranged between the luminescent lamp 1 and a liquid crystal panel (not shown).

The light scattering system prevents an image of the luminescent lamps 1 from being displayed onto a display screen (not shown), and provides a light source having uniform bright distribution. To enhance a light scattering effect, a plurality of diffusion sheets and a plurality of diffusion plates are arranged between LCD panel and luminescent lamps. The outer case 3 includes a reflecting plate 7 disposed on an interior side and is arranged to focus light emitted from the luminescent lamps 1 on a display part of the LCD panel (not shown), thereby enhancing light efficiency. The luminescent lamps 1 are commonly referred to as cold cathode fluorescent lamps (CCFLs) and function as a light source of an LCD device, when a power source is applied to electrodes 9a and 9b that are arranged at opposite ends of the luminescent lamps 1. The opposite ends of the luminescent lamps 1 are inserted to holes formed on opposing sides of the outer case 3.

However, the back light device according to the related art is problematic. For example, since only the opposite ends of the luminescent lamps 1 are fixed to the outer case 3, the luminescent lamps 1 may be damaged by external heat or sudden impact.

SUMMARY OF THE INVENTION

Accordingly, the present invention is directed to a back light device and a method of manufacturing a back light device that substantially obviates one or more problems due to limitations and disadvantages of the related art.

An object of the present invention is to provide a direct-type back light device in which luminescent lamps are securely fixed.

Another object of the present invention is to provide a direct-type back light device having uniform luminance.

Another object of the present invention is to provide a method of manufacturing a direct-type back light device in which luminescent lamps are securely fixed.

Another object of the present invention is to provide a method of manufacturing a direct-type back light device having uniform luminance.

Additional features and advantages of the invention will be set forth in part in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, a direct-type back light device includes a plurality of luminescent lamps, a rectangular frame having holes formed along opposing sides with the luminescent lamps inserted into the holes, a reflecting plate formed at a bottom surface of the rectangular frame, and at least one lamp holder attached to the reflecting plate and supporting the luminescent lamps.

In another aspect, a direct-type back light device includes a plurality of luminescent lamps, a rectangular frame having holes formed along opposing sides with the luminescent lamps fixed and supported within the holes, a reflecting plate formed at a bottom surface of the rectangular frame, a light scattering system formed at a top surface of the rectangular frame, at least one protrusion fixed to the reflecting plate and supporting the light scattering system, and at least one lamp holder attached to the reflecting plate and supporting the luminescent lamps.

In another aspect, a method for manufacturing a direct-type back light device includes providing a reflecting plate at a bottom surface of a rectangular frame, attaching at least one lamp holder to the reflecting plate, and inserting a plurality of luminescent lamps into holes of the rectangular frame, wherein the at least one lamp holder contacts a surface of each of the plurality of luminescent lamps.

In another aspect, a method of manufacturing a direct-type back light device includes providing a reflecting plate at a bottom surface of a rectangular frame, attaching at least one lamp holder to the reflecting plate, inserting a plurality of luminescent lamps into holes of the rectangular frame, attaching the plurality of luminescent lamps to the at least one lamp holder, attaching at least one protrusion to the reflecting plate, providing a light scattering system at a top surface of the rectangular frame, wherein the at least one protrusion supports the light scattering system.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 2:
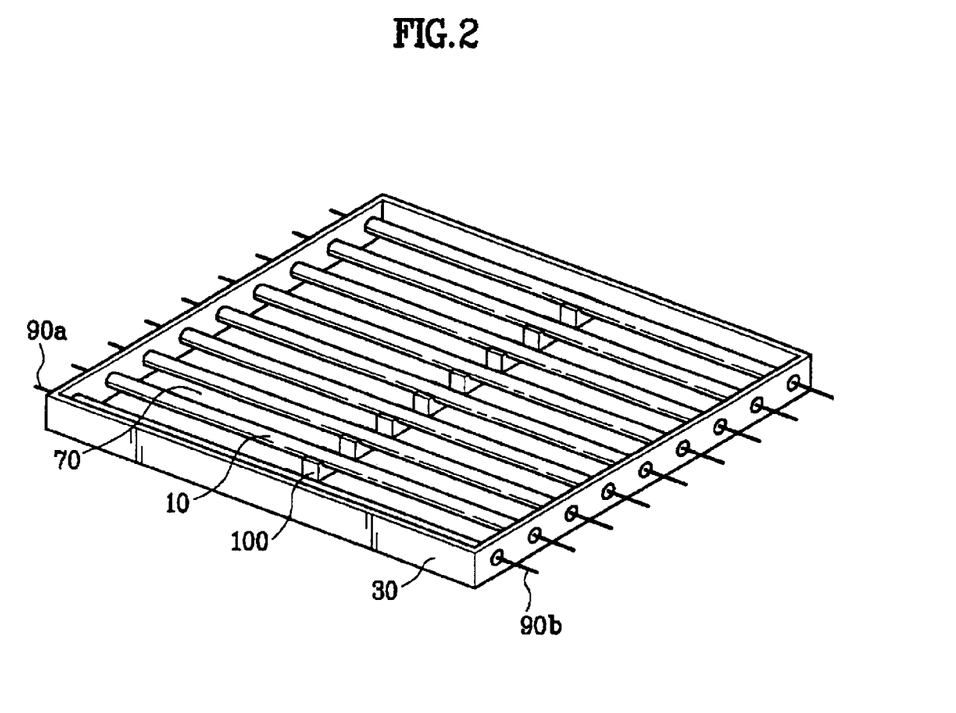
FIG. 2 is a perspective view of an exemplary direct-type back light device according to the present invention.

FIG. 2 is a perspective view of an exemplary direct-type back light device according to the present invention. In FIG. 2, a direct type back light may include a plurality of luminescent lamps 10 arranged in parallel, a rectangular frame 30 having a plurality of holes formed at opposing sides having the luminescent lamps 10 are therein, a reflecting plate formed at a bottom surface of the rectangular frame 30, and a lamp holder 100 fixed to the reflecting plate 70 and supporting the luminescent lamps 10.

The luminescent lamps 10 may be cold cathode fluorescent lamps (CCFLs), wherein electrodes are arranged at opposite ends of the luminescent lamps 10 and may be electrically connected to power source lines 90a and 90b for driving the luminescent lamps 10. The power source lines 90a and 90b may also be electrically connected to a driving circuit (not shown) via an additional connector (not shown).

The reflecting plate 70 may be arranged to focus light emitted from the luminescent lamps 10 onto a display part of a LCD panel (not shown), thereby enhancing light efficiency. The reflecting plate 70 may be formed of a light reflecting material, or may have a coating of a reflecting material on interior surfaces of the reflecting plate 70.

The lamp holder 100 supports the luminescent lamps 10 at approximately one-half of a length of the luminescent lamps 10. Accordingly, the lamp holder 100 may have different geometries and configurations.

Figure 3A:
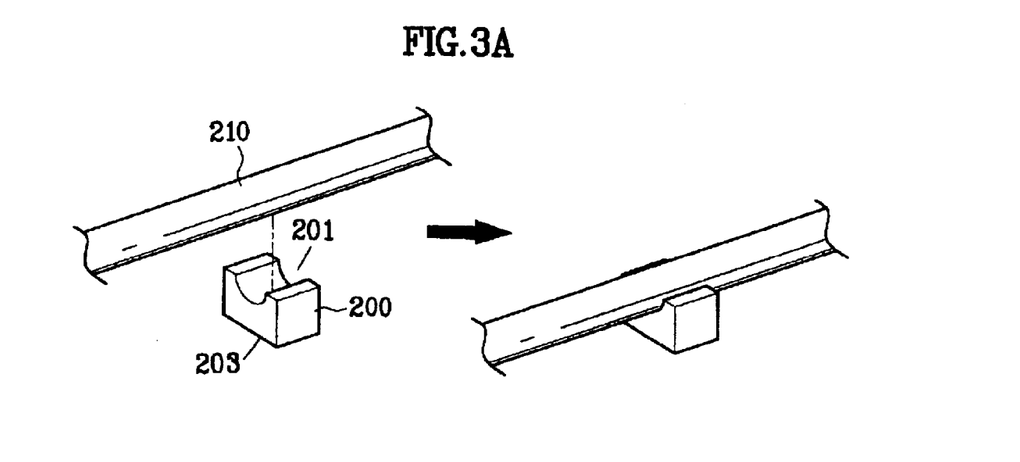
FIGS. 3A to 3C are perspective views of exemplary lamp holders for supporting luminescent lamps according to the present invention.
Figure 3B:
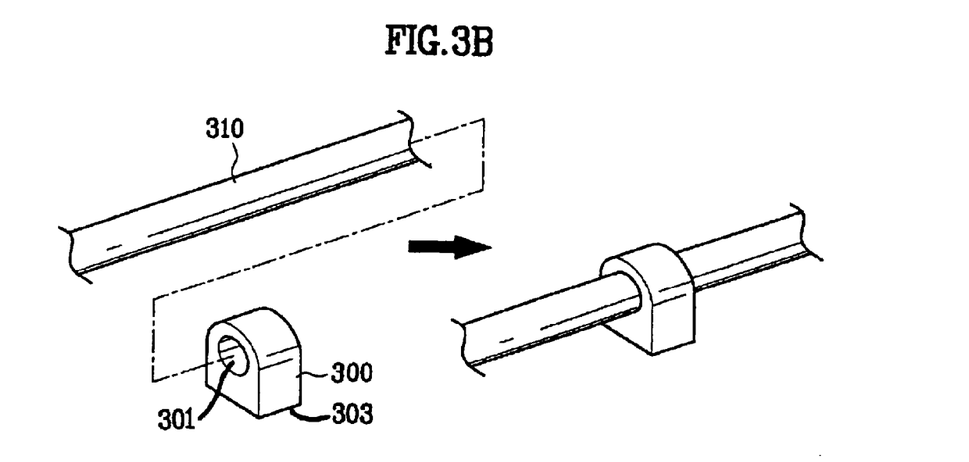
Figure 3C:
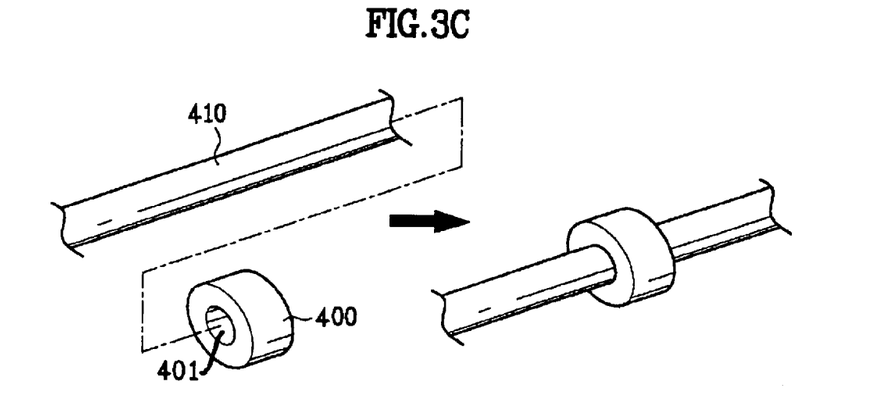

FIGS. 3A to 3C are perspective views of exemplary lamp holders for supporting luminescent lamps according to the present invention. In FIG. 3A, a lamp holder 200 may have a groove portion 201 for receiving a circumferential portion of an outer surface of a luminescent lamp 210 and a base portion 203 for contacting a reflecting surface (not shown). In FIG. 3B, a lamp holder 300 may have an opening 301 for receiving a circumferential surface of a luminescent lamp 310 and a base portion 303 for contacting a reflecting surface (not shown). In FIG. 3C, a lamp holder 400 may have an opening 401 for receiving a circumferential portion of a luminescent lamp 410. Alternatively, a lamp holder may be provided in which an opening receives either all or only a portion of a luminescent lamp. Likewise, a base portion may be provided having different geometric profiles.

Each of the lamp holders 100 of FIG. 2, and 200, 300, and 400 of FIGS. 3A to 3C may be arranged on a reflective surface, and may be formed of a transparent material or of a reflective material. In addition, the lamp holders 100 of FIG. 2, and 200, 300, and 400 of FIGS. 3A to 3C may be arranged in a staggered pattern or in a plurality of lines according to an overall length and placement of the luminescent lamps 10 in FIG. 2, and 210, 310, and 410 in FIGS. 3A to 3C.

In FIG. 2, although not specifically shown, a light scattering system may be formed at a top surface of the rectangular frame 30, thereby preventing an image of the luminescent lamps 10 from being displayed onto a display screen and providing a uniform distribution of light emitted from the luminescent lamps 10. In addition, a plurality of diffusion sheets and a plurality of diffusion plates may be arranged between LCD panel (not shown) and the luminescent lamps, thereby enhancing a light scattering effect.

Figure 4:
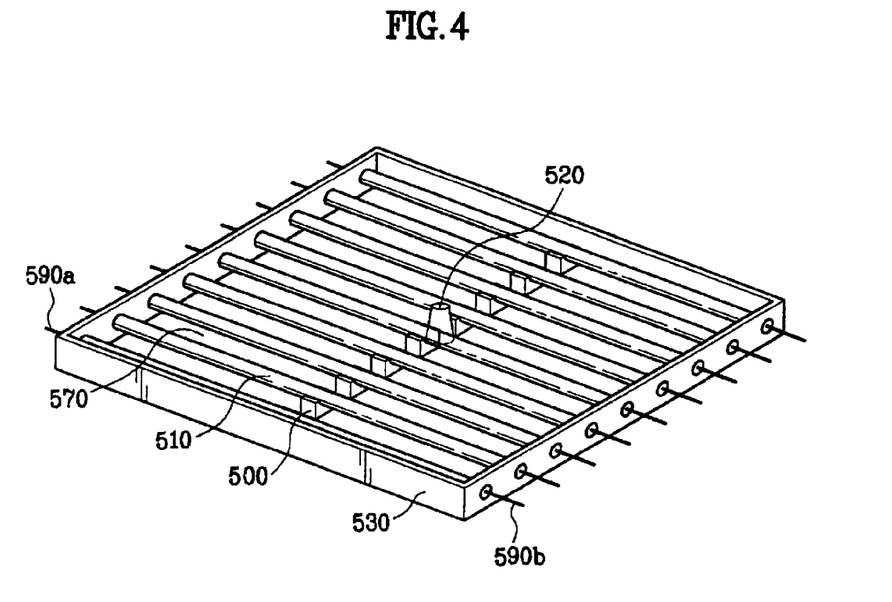
FIG. 4 is a perspective view of an exemplary direct-type back light device according to the present invention.

FIG. 4 is a perspective view of an exemplary direct-type back light device according to the present invention. In FIG. 4, a direct-type back light device may include a plurality of luminescent lamps 510 arranged in parallel along a line, a rectangular frame 530 having a plurality of holes formed at opposing sides, a reflecting plate 570, a lamp holder 500 and a protrusion 520.

The plurality of luminescent lamps 510 may be inserted to the holes formed at the opposing sides of the rectangular frame 530, and the lamp holder 500 may be formed at a bottom surface of the rectangular frame 530. The lamp holder 500 may support the luminescent lamps 510, and the protrusion 520 may be fixed to the reflecting plate 570 to support a light scattering system (not shown), thereby preventing the light scattering system from deforming and maintaining uniform luminance. Alternatively, a plurality of the protrusions 520 may be used for supporting the light scattering system. The plurality of protrusions 520 (not shown) may be distributed upon the reflecting plate 570 in any one of a geometric pattern.

Figure 5A:
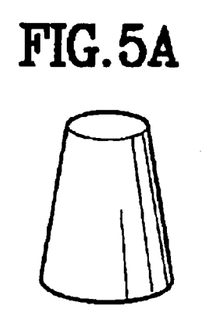
FIGS. 5A to 5D are a perspective views of exemplary protrusions for supporting a light-scattering system according to the present invention.
Figure 5B:
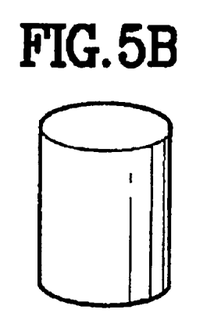
Figure 5C:
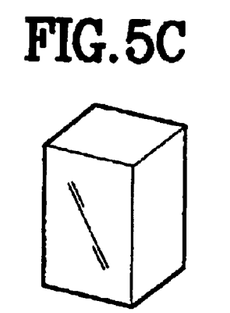
Figure 5D:
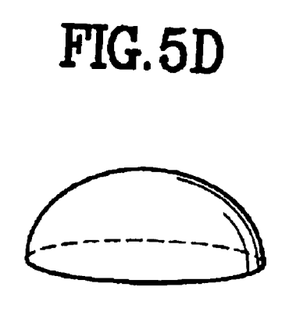

FIGS. 5A to 5D are a perspective views of exemplary protrusions for supporting a light-scattering system according to the present invention. In FIG. 5A, a protrusion may be formed of a truncated cone. In FIG. 5B, a protrusion may be formed of a cylindrical column. In FIG. 5C, a protrusion may be formed of a rectangular column. In FIG. 5D, a protrusion may be formed of a semi-circle or semi-ellipse. Accordingly, other geometric configuration may be used. Alternatively, a configuration of protrusions each having different geometries may be used.

In FIGS. 5A to 5D, the protrusions may be covered with a cap of a soft material to prevent mechanical damage between the protrusion 200 and a light scattering system contacted to the protrusions. The protrusions may be formed of a transparent material or a reflective material like the lamp holder 100. Alternatively, the protrusions may be formed a material having a reflective coating.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A direct-type back light device, comprising:
   a plurality of luminescent lamps;
   a rectangular frame having holes formed along opposing sides with the luminescent lamps inserted into the holes;
   a reflecting plate formed at a bottom surface of the rectangular frame; and
   at least one lamp holder attached to the reflecting plate and supporting the luminescent lamps,
   wherein the at least one lamp holder includes a semicircular groove receiving a circumferential surface of the luminescent lamps and the at least one lamp holder includes a reflective material.

2. The device according to claim 1, further including a light scattering system disposed at a top surface of the rectangular frame.

3. The device according to claim 2, further including at least one protrusion supporting the light scattering system.

4. The device according to claim 3, wherein the at least one protrusion includes at least one of a transparent material and a reflective material.

5. The device according to claim 1, wherein the at least one lamp holder includes a plurality of lamp holders corresponding to a total number of the luminescent lamps.

6. The device according to claim 1, wherein each of the luminescent lamps include electrodes disposed at opposite ends of the luminescent lamps.

7. A direct-type back light device, comprising:
   a plurality of luminescent lamps;
   a rectangular frame having holes formed along opposing sides with the luminescent lamps inserted into the holes;
   a reflecting plate formed at a bottom surface of the rectangular frame; and
   at least one lamp holder attached to the reflecting plate and supporting the luminescent lamps,
   wherein the at least one lamp holder includes a hole receiving a surface of the luminescent lamps and the at least one lamp holder includes a reflective material.

8. The device according to claim 7, further including a light scattering system disposed at a top surface of the rectangular frame.

9. The device according to claim 8, further including at least one protrusion supporting the light scattering system.

10. The device according to claim 9, wherein the at least one protrusion includes at least one of a transparent material and a reflective material.

11. The device according to claim 7, wherein the at least one lamp holder includes a plurality of lamp holders corresponding to a total number of the luminescent lamps.

12. The device according to claim 7, wherein each of the luminescent lamps include electrodes disposed at opposite ends of the luminescent lamps.

13. A direct-type back light device, comprising:
    a plurality of luminescent lamps;
    a rectangular frame having holes formed along opposing sides with the luminescent lamps fixed and supported within the holes;
    a reflecting plate formed at a bottom surface of the rectangular frame;
    a light scattering system formed at a top surface of the rectangular frame;
    at least one protrusion fixed to the reflecting plate and supporting the light scattering system; and
    at least one lamp holder attached to the reflecting plate and supporting the luminescent lamps,
    wherein the at least one lamp holder includes a semicircular groove receiving a circumferential surface of the luminescent lamps and the at least one lamp holder includes a reflective material.

14. The device according to claim 13, wherein the at least one protrusion includes at least one of a transparent material and a reflective material.

15. The device according to claim 13, wherein the at least one lamp holder includes a plurality of lamp holders corresponding to a total number of the luminescent lamps.

16. A direct-type back light device, comprising:
    a plurality of luminescent lamps;
    a rectangular frame having holes formed along opposing sides with the luminescent lamps fixed and supported within the holes;
    a reflecting plate formed at a bottom surface of the rectangular frame;
    a light scattering system formed at a top surface of the rectangular frame;
    at least one protrusion fixed to the reflecting plate and supporting the light scattering system; and
    at least one lamp holder attached to the reflecting plate and supporting the luminescent lamps,
    wherein the at least one lamp holder includes a hole receiving a surface of the luminescent lamps and the at least one lamp holder includes a reflective material.

17. The device according to claim 16, wherein the at least one protrusion includes at least one of a transparent material and a reflective material.

18. The device according to claim 16, wherein the at least one lamp holder includes a plurality of lamp holders corresponding to a total number of the luminescent lamps.

19. A method for manufacturing a direct-type back light device, comprising:
    providing a reflecting plate at a bottom surface of a rectangular frame;
    attaching at least one lamp holder to the reflecting plate; and
    inserting a plurality of luminescent lamps into holes of the rectangular frame,
    wherein the at least one-lamp holder includes a semicircular groove receiving a circumferential surface of each of the plurality of luminescent lamps and the at least one lamp holder includes a reflective material.

20. The method according to claim 19, further including providing a light scattering system at a top surface of the rectangular frame.

21. The method according to claim 20, further including providing at least one protrusion supporting the light scattering system.

22. The method according to claim 21, wherein the at least one protrusion includes at least one of a transparent material and a reflective material.

23. The method according to claim 19, wherein the at least one lamp holder includes a plurality of lamp holders corresponding to a total number of the luminescent lamps.

24. A method for manufacturing a direct-type back light device, comprising:

providing a reflecting plate at a bottom surface of a rectangular frame;

attaching at least one lamp holder to the reflecting plate; and inserting a plurality of luminescent lamps into holes of the rectangular frame, wherein the at least one lamp holder contacts a surface of each of the plurality of luminescent lamps and includes a hole receiving a surface of the luminescent lamps, and the at least one lamp holder includes a reflective material.

25. The method according to claim 24, further including providing a light scattering system at a top surface of the rectangular frame.

26. The method according to claim 24, further including providing at least one protrusion supporting the light scattering system.

27. The method according to claim 26, wherein the at least one protrusion includes at least one of a transparent material and a reflective material.

28. The method according to claim 24, wherein the at least one lamp holder includes a plurality of lamp holders corresponding to a total number of the luminescent lamps.

* * * * *